United States Patent [19]

Buse et al.

[11] Patent Number: 4,621,265
[45] Date of Patent: Nov. 4, 1986

[54] MILLIMETER WAVE PASSIVE/ACTIVE SIMULATOR ARRAY AND METHOD OF EVALUATING THE TRACKING CAPABILITY OF AN ACTIVE/PASSIVE TARGET SEEKER

[75] Inventors: Leland C. Buse, Bellevue; George A. Eastman, Renton, both of Wash.

[73] Assignee: The Boeing Company, Seattle, Wash.

[21] Appl. No.: 430,352

[22] Filed: Sep. 30, 1982

[51] Int. Cl.$^4$ .................................................. G01S 7/40
[52] U.S. Cl. ........................................ 342/169; 374/2; 250/252.1
[58] Field of Search ................. 343/17.7, 18 R, 18 A, 343/18 B, 18 C, 18 D, 18 E; 434/2; 374/2, 126; 250/252.1; 356/243

[56] References Cited

U.S. PATENT DOCUMENTS

| | | | |
|---|---|---|---|
| 1,713,213 | 5/1929 | Bissiri | 340/764 |
| 2,920,529 | 1/1960 | Blythe | 310/306 |
| 3,161,726 | 12/1964 | Todt | 340/703 |
| 3,227,879 | 1/1966 | Blau et al. | 219/345 |
| 3,478,211 | 11/1969 | Moser | 250/316.1 |
| 3,760,418 | 9/1973 | Cash et al. | 343/18 D X |
| 3,897,997 | 8/1975 | Kalt | 40/447 |
| 3,906,499 | 9/1975 | Redman | 343/17.7 |
| 3,955,199 | 5/1976 | Hutzelman et al. | 343/17.7 |
| 3,986,384 | 10/1976 | Giorgi | 374/126 |
| 4,106,345 | 8/1978 | Saunders et al. | 343/17.7 X |
| 4,240,212 | 12/1980 | Marshall et al. | 219/354 |
| 4,314,249 | 2/1982 | Onoe | 343/18 D |
| 4,387,301 | 6/1983 | Wirick et al. | 374/2 X |
| 4,467,327 | 8/1984 | Drake et al. | 343/17.7 |

OTHER PUBLICATIONS

Onoe et al, "Radar Reflectors with Controllable Reflection", Electronics and Comm. in Japan, vol. 63-B, No. 3, Mar./80, pp. 51-58.

Primary Examiner—T. H. Tubbesing
Assistant Examiner—Gilberto Barrón, Jr.
Attorney, Agent, or Firm—Finnegan, Henderson, Farabow, Garrett & Dunner

[57] ABSTRACT

An array of target elements having emissivity and reflectivity properties variable in accordance with a data processing simulation of the electromagnetic signature of a target and target terrain suitable for evaluating the tracking capabilities of an active/passive millimeter wave target seeker.

15 Claims, 3 Drawing Figures

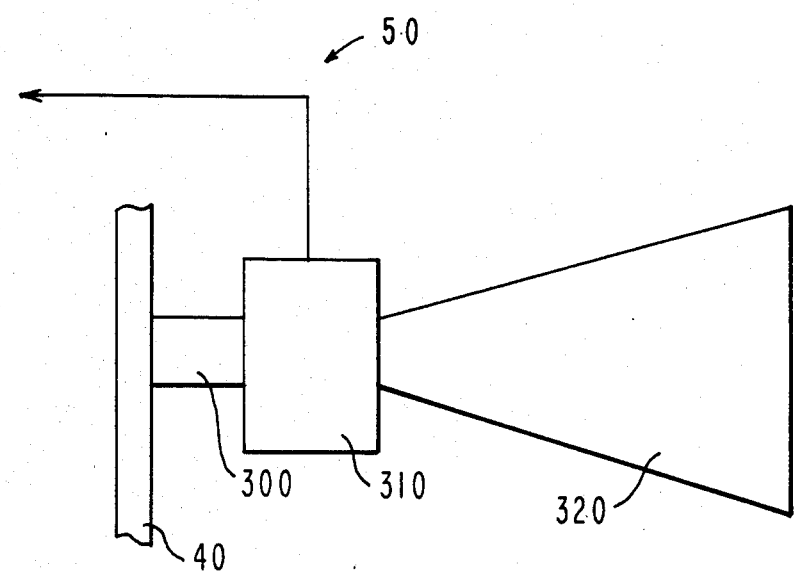

MILLIMETER WAVE PASSIVE/ACTIVE SIMULATOR ARRAY AND METHOD OF EVALUATING THE TRACKING CAPABILITY OF AN ACTIVE/PASSIVE TARGET SEEKER

FIELD OF THE INVENTION

This invention relates to a simulator of the electromagnetic signature of a target sought by an active/passive mode millimeter wave missile seeker device and a method for evaluating the tracking performance of an active/passive mode millimeter wave missile seeker.

BACKGROUND OF THE INVENTION

A missile guidance system relies upon the electromagnetic signature of a target to differentiate the target from the background terrain and to locate the position of the target. An object in the field of view of the missile guidance system radiates, or emits, electromagnetic energy and also reflects electromagnetic energy. The combined emission and reflection characteristics of the object determine its electromagnetic signature.

The on-going development of millimeter wave missile seekers has created a need for increasingly more sophisticated facilities for testing the increased capabilities of each succeeding generation of missile seeking devices. It is desirable to test the target response of a new seeker design by simulating in a laboratory the electromagnetic signature of a missile seeker target and its environment. Cost and convenience factors make laboratory testing preferable to on-site testing of the seeker under actual flight conditions.

It is also desirable to be able to test with the same testing facilities the two types of missile seeker guidance systems which have evolved. Passive millimeter wave seekers differentiate a target from surrounding background by detecting differences in radiometric temperature (emissivity differences in the millimeter wave portion of the electromagnetic spectrum). Passive millimeter wave seekers are dependent upon the emissivity/reflectivity characteristic contrast between the target and the target background, and require target signature simulators having variable emissivity/reflectivity capabilities. Active millimeter wave seekers use radar techniques for locating the position of their targets. Active seekers transmit electromagnetic energy and detect the reflection of that energy from the target and the background surrounding the target. Thus, seekers employing the active mode require target signature simulators having variable reflectivity characteristics.

Development of millimeter wave seekers capable of both active and passive modes of detection has increased the desirability of a target signature simulator capable of providing both active and passive electromagnetic target signatures.

An anechoic radar simulator uses a chamber with anechoic material lining the walls. The anechoic simulator is capable of providing real-time target simulations for evaluating active mode missile seekers. However, the anechoic radar simulator cannot provide real-time target signature simulations for passive millimeter wave seekers because the high emissivity characteristics of the anechoic material on the chamber walls cause high radiometric temperatures, which mask the passive seeker under evaluation. Thus, anechoic chambers are not useful for evaluating a passive/active (dual mode) millimeter wave seeker without modification of the seeker to allow for the chamber temperature effects. It is not feasible to install such modifications in some seekers, because of the particular design of the seeker. Moreover, such modifications reduce the credibility of the resulting test data. Ideally, the simulator facility should be capable of accommodating any seeker without requiring modification of the seeker.

A target signature simulator array adapted for active mode missile seeker target tracking evaluations is disclosed in U.S. Pat. No. 4,467,323 issued to Drake et al, which is assigned to the assignee of the present invention, and which is incorporated herein by reference. As in all active mode simulators, a simulator transmitter is required to enable the range finding function of the active mode seeker to be evaluated. The Drake et al simulator uses a cluster of active antenna elements, a millimeter wave spectrum analyzer, a computer and a target control circuit to receive active mode seeker signals and to generate time-delayed simulated target response signals, the latter being received by the seeker under evaluation.

A simulation facility for dynamically testing guidance systems which use radio frequencies is disclosed in U.S. Pat. No. 4,106,345 issued to Saunders et al on Aug. 15, 1978, and which is incorporated herein by reference. This patent also is assigned to the assignee of the present invention. The Saunders et al simulation facility is designed for testing passive seekers in the radiometric frequency band comprising generally the millimeter and microwave frequency ranges (18 GHz to 350 GHz). Included in this facility is a target signature simulator array comprised of dynamically controllable noise sources which, when energized, emit energy at radiometric frequencies to simulate the radiometric appearance of terrain and selected objects and targets. Calibration of these noise sources is a difficult task, because the frequency band of the emissions varies with the power output of the emission. The array of noise sources is located inside a chamber having interior walls lined with a reflective material of very low emissivity coefficient, such as aluminum foil.

Simulator apparatus which attempt to combine simulator arrays capable of testing active mode seekers, like the Drake et al array, and a chamber used in testing passive seekers, like the Saunders et al chamber, in order to obtain a simulator facility capable of providing a dual mode simulation of the electromagnetic signature of a target and its surrounding terrain, have met with only limited success.

Active mode seekers may transmit continuously or in pulses. It is possible to test an active mode pulse seeker by placing an active mode target signature simulator array, as in Drake et al, inside a radiometrically cold simulation chamber, like the chamber of the Saunders et al facility. However, the fully reflecting walls of the radiometrically cold chamber create a problem associated with echoing signals, whether they be echoes from signals emitted by the seeker or signals emitted by the simulator apparatus. Drake et al. teaches that steps can be taken to ameliorate, but not eliminate entirely, the echo problem. These steps include preferred orientations of the chamber walls relative to the seeker and the signal transmitting apparatus of the simulator and provision for reflection baffling within the radiometrically cold chamber. However, some echo always remains to introduce secondary effects into the test data. Moreover, the different apparatus in Drake et al. require expensive millimeter wave components and are capable only of point-source active targets. An extended area scene would require a target signature simulator array of Drake et al active antenna clusters. Provision of such an array is cost prohibitive.

To date it has proved beyond the state of the art to eliminate the echo problem attendant testing of active mode seekers employing a continuous transmission signal in a radiometrically cold wall chamber, such as found in Saunders et al.

OBJECTS AND SUMMARY OF THE INVENTION

It is, therefore, the principal object of the present invention to provide at relatively low cost a target signature simulator array which will provide valid extended area target signature simulations for either active or passive millimeter wave missile guidance modes.

Another object of this invention is to provide an extended area target scene simulator for evaluating dual mode millimeter wave missle seekers without requiring the use of expensive millimeter wave components.

Another object of this invention is to provide a relatively mechanically uncomplicated and easily calibrated extended area target scene simulator array for evaluating dual mode millimeter wave missile seekers.

Yet another object of this invention is to provide a simulator for evaluating dual mode millimeter wave missile seekers that includes a target array upon which can be presented a spatially distributed electromagnetic signature in real-time under computer control to simulate the presence of a target and its background terrain.

It is also an object of the present invention to provide at relatively lower cost than presently available a method of evaluating an active/passive millimeter wave missile seeker in a laboratory environment capable of simulating an extended area target scene signature.

These and other objects are accomplished by an extended area target scene simulator array for simulating both active and passive targets and the background terrain of the targets to permit tracking evaluations of an active/passive mode target seeker, the simulator comprising: a support; an array of target elements mounted on the support for exposing to the seeker a portion of each of the target elements and shielding from the seeker a portion of each of the target elements, each of the target elements partially exhibiting a first material substantially reflective of incident electromagnetic energy and partially exhibiting a second material substantially absorptive of incident electromagnetic energy; and means for varying individually for each target element on the support the ratio of the exhibited reflective portion of the element to the exhibited absorptive portion of the element such that the electromagnetic reflectivity and emissivity characteristics of the array as a whole simulate the target and the background terrain of the target.

The means for individually varying the ratio of the absorptive to reflective portions of the target elements may comprise for each target element a magnetically actuated positioner individually controllable by a data processing system.

In an alternative embodiment of the present invention, target elements are provided having electronically variable absorptive/reflective characteristics. Examples of electronic means suitable for varying the absorptive/reflective characteristics of these alternative embodiment target elements include a faraday rotator, a PIN diode and a Schottky barrier diode.

Another of the principal objects of the invention is accomplished by a method of simulating relative motion between a target and the target background, for purposes of evaluating the spatial differentiation capabilities of an active/passive mode millimeter wave missile seeker, comprising providing in a radiometrically cold room an array of target elements, each of the target elements being mounted on a support to have a portion of the target element exposed to the millimeter wave seeker, a portion of the target element shielded from the millimeter wave seeker and each element being partially covered with a first material substantially reflective of incident electromagnetic energy and partially covered with a second material substantially absorptive of incident electromagnetic energy; and varying individually the positioning of each target element on the support to expose to the seeker being evaluated selected amounts of the first material and the second material so that the array of elements simulates an extended area target scene having corresponding reflectivity and emissivity characteristics.

BRIEF DESCRIPTION OF THE DRAWINGS

The accompanying drawings which are incorporated in and constitute a part of the specification, illustrate an embodiment of the invention and, together with the description, serve to explain the principles of the invention.

FIG. 3 is a schematic illustration of an alternative embodiment of an individual target element.

DETAILED DESCRIPTION OF THE PREFERRED EMBODIMENT

In accordance with the invention, the extended area target scene signature simulator array for simulating both active/passive mode targets to facilitate tracking evaluations of an active and passive target seeker, comprises a support; an array of target elements mounted on the support for exposing to the seeker a portion of each of the target elements and shielding from the seeker a portion of each of the target elements, each of the target elements partially exhibiting a first material substantially reflective of incident electromagnetic energy and partially exhibiting a second material substantially absorptive of incident electromagnetic energy; and means for varying individually for each target element on the support the ratio of the exhibited reflective portion of the element to the exhibited absorptive protion of the element such that the electromagnetic reflectivity and emissivity charactersitics of the array as a whole simulate the electromagentic signature of both the target and the target's background terrain.

Figure 1:
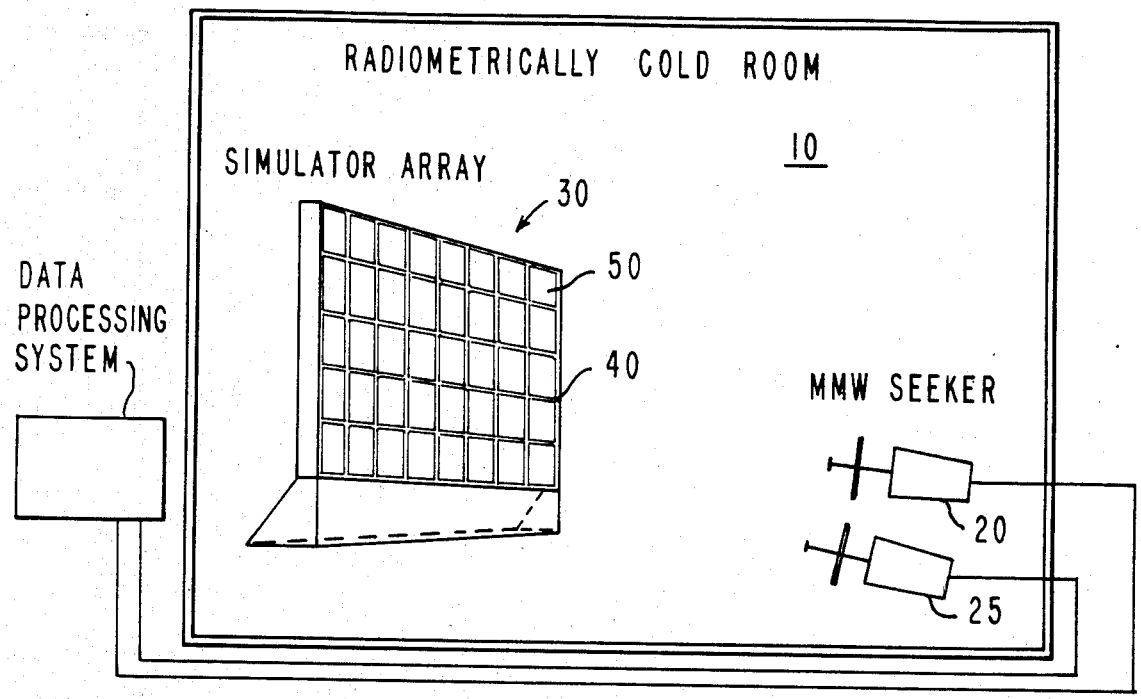
FIG. 1 illustrates an embodiment of the array of the present invention situated within a radiometrically-cold simulation chamber in view of the missile seeker to be tested.

A radiometrically cold room, indicated generally as 10 in FIG. 1, contains the millimeter wave seeker device 20 to be evaluated and the extended area target scene signature simulator array, indicated generally by the numeral 30. The target simulator has support 40 upon which are mounted an array of target elements 50.

Figure 2:
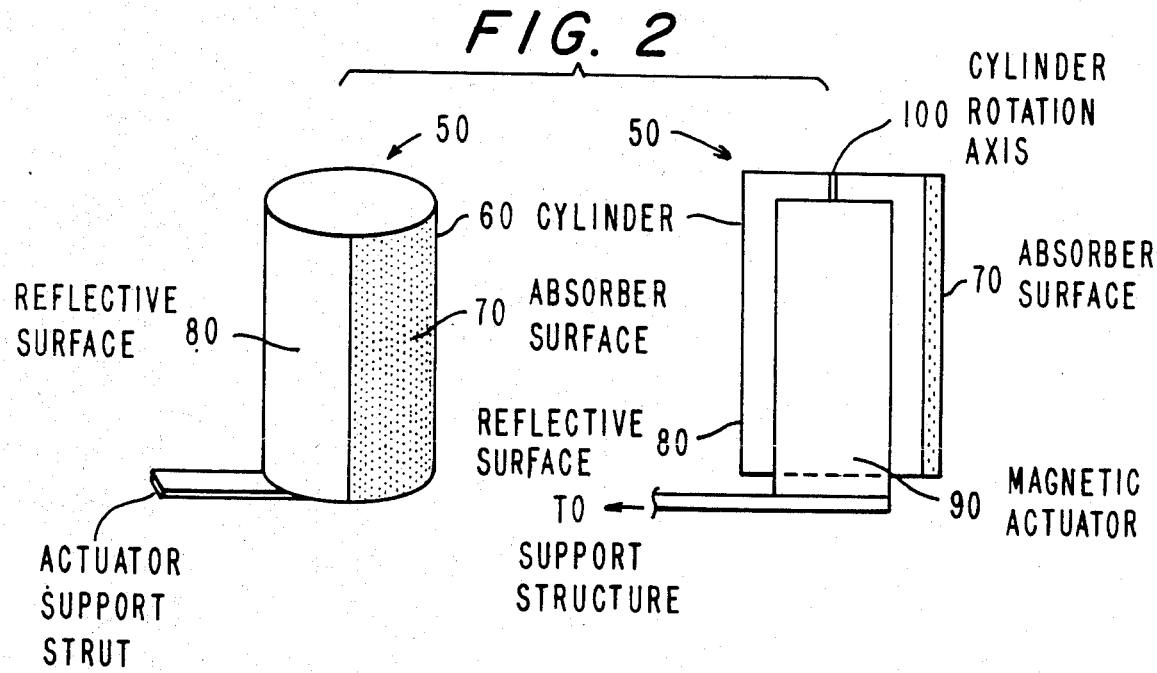
FIG. 2 illustrates one embodiment of an individual target element.

FIG. 2 illustrates in detail one embodiment of target element 50. Each target element comprises a cylinder 60 having an exterior surface partially covered by an absorber surface 70 and partially covered by a reflective surface 80. Graphite loaded polyurethane is a suitable material for the absorber surface 70. Aluminum foil and tin foil are preferred materials for the reflective surface 80 because aluminum and tin are highly reflective and relatively inexpensive metals. Other metallic substances, including copper, silver or gold, or metallic covered composites, like metallized mylar, would be suitable materials for the reflective surface 80.

The size of each cylinder 60 depends upon the resolution capability of the seeker being tested. It is preferrable to choose a cylinder dimension which is smaller than the resolution capability of the seeker being tested. This permits more exact definition of the radiometric signature seen by the seeker, because several target elements 50 can be averaged to yield the signature seen by the seeker. Each cylinder 60 is rotatably mounted on a magnetic actuator 90. The rotational axis 100 of each cylinder 60 may lie parallel to the plane surface of the support 40 when the target element 50 is mounted on the support 40.

As embodied herein, the magnetic actuator 90 is controllable by a data processing system (shown schematically in FIG. 1 and known in the art) which determines, in accordance with a program for simulating the electromagnetic signature of a target and its terrain, the relative exposure to the millimeter wave seeker 20 of each reflective surface 80 relative to each absorber surface 70. In this way each target element 50 of the array is controlled by the data processing system to vary in reflectivity/emissivity, as required to simulate the desired characteristic target and background reflectively/emissivity.

FIG. 3 illustrates an alternative embodiment of target element 50. Mounted on the support 40 is a nonreflective antenna terminus 300. A variable reflectivity modulator 310 is connected to the terminus 300 and to the data processing system, the latter shown schematically in FIG. 1. The reflectivity modulator 310 is electronically rendered reflective to a degree predetermined by the data processing system program in accordance with the desired reflectivity/absorptivity radiometric profile of the target scene. Antenna 320 is connected to reflectivity modulator 310.

A fully absorbing load, which is matched to the characteristic impedance of the antenna, is one example of a non-reflective antenna terminus 300. Examples of modulators 310 are faraday rotators, PIN diodes and Schottky barrier diodes. Faraday rotators and PIN diodes are modulating devices which are used as attenuators and switches in millimeter wave applications. Schottky barrier diodes are commonly used in millimeter wave detectors and mixers.

The operation of the alternative embodiment of target element 50 illustrated in FIG. 3 now will be described. Millimeter waves received by anntenna 320 ordinarily are totally absorbed by non-reflective terminus 300. Actuation of the variable reflectivity modulator 310 occurs under the control of the data processing system. When modulator 310 is actuated, the millimeter waves received by the antenna 320 are intercepted and reflected away from the non-reflective terminus 300. The amount of incident energy reflected by the modulator 310 is electronically variable, as known in the art. Thus, element 50 exhibits a reflective characteristic to incident electromagnetic radiation. The degree of reflection effected by modulator 310 accordingly varies the reflectivity/absorptivity of each element 50.

The absence of mechanically moving parts in the FIG. 3 embodiment eliminates mechanical maintenance as a potential problem associated with use of the apparatus over long periods of time. Moreover, the electronic nature of the means for effecting changes in the absorptive/reflective characteristics of each target element permits the embodiment illustrated in FIG. 3 to respond to data processing system control inputs at higher rates of speed than is possible when using mechanically actuated devices for varying the reflective/absorptive characteristics of each target element.

Each target element 50 is controllable by the data processing system such that the overall electromagnetic signature of the target simulator 30 duplicates the electromagnetic signature characteristic of an extended area scene including the target and the target background terrain. Moreover, the magnetic positioners 90 or reflectivity modulators 310 can be operated so that the characteristic electromagnetic signature also can be varied in real time by the data processing system to simulate relative motion between the simulated target and the simulated terrain of the target. The relative orientation of different subjects in the overall scene presented by the simulator array 30 to the seeker 20 can be changed by suitably programming the data processing system, which individually controls the magnetic positioners 90 or the reflectivity modulators 310, depending upon the particular target element embodiment being used.

Calibration of each mechanically activated array element 50 is relatively simple because the radiometric temperature profile of each element is directly dependent upon the relative areas of reflective versus absorbing material exposed to the radiometric detection device employed by the seeker. The absorbing surfaces emit a room temperature radiometric profile, unless the absorbing surfaces are heated. If the absorbing surfaces are heated (by a heater not shown) above room temperature, then they will emit a profile higher than the room temperature radiometric profile. The reflecting surfaces 80 of the simulator array 30 are situated in the chamber 10 so that their radiometric temperature profile is that of the cold sky. This is accomplished by exposing the reflecting surfaces 80 to the atmosphere outside chamber 10 in a manner which is explained in the Saunders et al disclosure and the Drake et al disclosure.

The characteristic radiometric profile of a single mechanically variable absorptive/reflective element 50 will be at the same ratio of temperatures of the room and sky as the ratio of areas exposed to the seeker of the reflective surface 80 and absorbing surface 70. For example, if 50% of the total exposed surface area of element 50 is absorptive and 50% is reflective, then the radiometric temperature profile would be a temperature equal to the sum of 50% of the absolute room temperature and 50% of the absolute sky temperature. As another example, consider a room temperature of 260° K. and a sky temperature of 20° K. If 70% of the exposed area of element 50 is absorbing and 30% of the area exposed to the seeker is reflecting, then the overall radiometric temperature profile of that element would be calculated as follows: $70\% \times 260°$ K. $+ 30\% \times 20°$ K. $= 182°$ K. $+ 6°$ K. $= 188°$ K.

The characteristic radiometric profile of a single electronically variable absorptive/reflective element 50 will vary between room temperature, in the absence of any provision for auxiliary heating, and the cold sky temperature. In the absence of any provision for a heating element connected to the nonreflective antenna terminus 300, the target element 50 ordinarily will exhibit a room temperature radiometric profile while the reflectivity modulator 310 is not activated. Activation of the reflectivity modulator 310 for full reflection of incident millimeter waves results in a radiometric temperature of the cold sky. Activation of the reflectivity modulator 310 for partial reflection results in a radiometric temperature profile intermediate that of the room temperature and the temperature of the cold sky. The precise temperature is determinable once the target element has been calibrated, as known in the art.

Typically, the seekers under evaluation do not sense absolute temperatures of the targets and the target terrain. The temperature differences between adjacent areas within the resolution capabilities of the seeker are integrated to develop a temperature profile of the scene within the viewing field of the seeker. Thus, the simulator array need only be capable of exhibiting a temperature range sufficient to encompass the temperature difference between typical targets and target terrain. The difference between the radiometric temperature profile of an element at room temperature and an element at the temperature of the cold sky is approximately 200 degrees Kelvin. This 200 degrees of absolute temperature range provides the simulator array with adequate contrast capabilities.

When testing an active mode seeker device of the pulse signal type, it is necessary to employ signal decay apparatus for eliminating reflections of the seeker signal and of the simulator transmitter signal as described earlier in reference to Drake et al. A frequency spectrum analyzer and a radio frequency transmitter 25 must be employed in conjunction with the data processing center (shown schematically in FIG. 1 and known in the art), simulator array 30, seeker 20 and radiometrically cold room 10 in order to test the range finding capability of a pulse emitting active mode seeker.

The initial signal pulse transmission of the active mode seeker reflects off the simulator array 30, typically about 50 feet away from the seeker, and returns to the seeker before the seeker is able to change from its transmission mode of operation to its receiver mode of operation. Therefore, the seeker is unable to detect the initial reflection of its transmitted signal from the simulator array 30. Thus, the seeker is said to be "blind" over the 100 foot distance (50 feet from seeker to array plus 50 feet from array to seeker) which must be travelled by the seeker transmitted signal reflected from the simulator array. The signal decay apparatus provided within chamber 10 serves to eliminate further reflected signals of significant intensity from being received by the seeker under evaluation. The simulator transmitter 25 employed for testing the active mode seeker is preferably situated close to the seeker rather than close to the simulator array.

The individual elements 50 of simulator array 30 are set in accordance with the data processing system program for each target element embodiment to expose within the field of view of the seeker a selected reflective/absorptive characteristic radiometric signal so that the overall electromagnetic signature seen by the seeker is interpreted by the seeker as an extended area scene, including a target and target background terrain.

The simulator transmitter 25 is a radio frequency transmitter which emits a pulsed radio frequency signal aimed at the simulator array 30. Timing of the pulses emitted by transmitter 25 are delayed from the seeker pulse transmissions in order to simulate the time which would be required for the signal to travel from the seeker to the target. The transmitter 25 emitted signal is then reflected off the simulator array towards the seeker under evaluation. The seeker receives the signal reflected off simulator array 30. Further reflections of the signal transmitted from the simulator transmitter 25 are eliminated by suitable signal decay techniques, such as reflection baffling and preferred orientation of the walls of the radiometrically cold room relative to the seeker under evaluation 20, the simulator array 30 and the simulator transmitter 25. The decay of the originally transmitted signal, whether from the seeker under evaluation 20 or the simulator transmitter 25, occurs before the signal has travelled a total of about 200 feet.

The testing of a passive mode seeker requires the simulator array 30 to be situated inside the radiometrically cold chamber 10 in the field of view of seeker 20. The reflecting surfaces 80 exhibit the cold sky temperature of the outside atmosphere, and the absorbing surfaces 70 exhibit the temperature inside the chamber.

It further will be apparent to those skilled in the art that various modifications and variations can be made to the extended area target scene simulator array of the present invention without departing from the scope or spirit of the invention, and it is intended that the present invention cover the modifications and variations of the simulator array provided that they come within the scope of the appended claims and their equivalents.

What is claimed is:

1. An extended area target scene signature simulator array for simulating targets and the background terrain of the targets to facilitate tracking evaluation of an active/passive mode millimeter wave target seeker, the simulator comprising:

a support;

an array of target elements mounted on said support for exposing to the seeker a portion of each of said target elements and shielding from the seeker a portion of each of said target elements, each of said target elements partially exhibiting a first material substantially reflective of incident electromagnetic energy and partially exhibiting a second material substantially absorptive of incident electromagnetic energy;

means for transmitting electromagnetic energy toward said target array; and means for dynamically controlling said transmitting means and for dynamically varying, individually for each said target element on said support, the ratio of said exposed exhibited reflective portion of each said element to said exposed exhibited absorptive portion of each said element such that the exposed reflective and absorptive characteristics to incident electromagnetic energy of the array as a whole simulates the target and the background terrain of the target.

2. An extended area target scene simulator array for simulating both active and passive targets to permit evaluations of the tracking perfomance of an active and passive mode millimeter wave target seeker, the simulator comprising:

a support;

an array of rotatable cylindrical target elements mounted on said support, a portion of each of said elements being exposed to said millimeter wave seeker and a portion being shielded from said millimeter wave seeker, each of said target elements being partially covered with a first material substantially reflective of incident electromagnetic energy and partially covered with a second material substantially absorptive of incident electromagnetic energy;

means for transmitting electromagnetic energy toward said target array; and means for dynamically controlling said transmitting means and for dynamically varying the positioning of said target elements on said support individually to expose selected amounts of said first material and said second material for simulating a target having corresponding reflectivity and emissivity characteristics to incident electromagnetic energy.

3. An apparatus as in claim 1 or 2, wherein said individually variable means comprises a magnetically actuated positioner for each target element and a data processing system for controlling actuation of said positioners.

4. An extended area target scene simulator array adaptable for both active and passive mode millimeter wave missile seeker target tracking evalutions, comprising:

a support; and a plurality of rotatable cylindrical surfaces, each said surface including a rotating means and a longitudinal axis coplanar to each said surface, wherein each said rotating means is attached to said support and each said cylindrical surface is partially covered with material reflective of incident electromagnetic energy and partially covered with material absorptive of incident electromagnetic energy.

5. An apparatus as in claim 4, wherein said rotating means comprises a magnetic positioner.

6. An apparatus as in claim 5, wherein said magnetic positioner is enclosed inside said cylindrical surface.

7. An apparatus as in claim 4 also including means for controlling each said rotating means individually for dynamically varying the reflectivity and absorptivity of each said cylindrical surface exposed to said target seeker.

8. An apparatus as in claim 7, wherein the control means comprises a data processing system.

9. An extended area target scene signature simulator array for simulating targets and the background terrain of the targets to facilitate tracking evaluations of an active/passive mode millimeter wave target seeker, the simulator array comprising:

a support;

an array of target elements mounted on said support, each said element having relective and absorptive properties;

an electronically actuable means for dynamically varying the reflective and absorptive properties of each said target element such that the reflective and absorptive characteristics to incident electromagnetic energy of the array as a whole simulate the target and the background terrain of the target.

10. An extended area target scene signature simulator array as in claim 9, wherein each said target element comprises:

an antenna and a non-reflective antenna terminus connected to said antenna.

11. An extended area target scene signature simulator array as in claim 10, wherein each said electronically actuable means comprises a faraday rotator device.

12. An extended area target scene signature similator array as in claim 10, wherein each said electronically actuable means comprises a PIN diode.

13. An extended area target scene signature simulator array as in claim 10, wherein each said electronically actuable means comprises a Schottky barrier diode.

14. A method of facilitating the simulation of a target and the target background at a particular range relative to an active/passive mode millimeter wave seeker, comprising the steps of:

providing, in a radiometrically cold room, an array of target elements, each of said target elements being mounted on a support and being partially covered with a first material substantially reflective of incident electromagnetic energy and partially covered with a second material substantially absorptive of incident electromagnetic energy and having a first portion exposed to incident electromagnetic energy, a second portion shielded from incident electromagnetic energy;

transmitting electromagnetic energy toward said array for simulation when said seeker is in an active mode; and individually positioning said target elements on said support to expose in said first portion selected amounts of said first material and said second material so that electromagnetic energy reflected from said array of said elements simulates the electromagnetic reflectivity and emissivity characteristics corresponding to said target and said target background at a particular range relative to said seeker.

15. A method of facilitating the simulation of relative motion between a target and the background terrain, for purposes of evaluating an active mode millimeter wave seeker, comprising the steps of:

providing, in a radiometrically cold room, an array of target elements, each of the target elements being mounted on a support and having a first portion of said element exposed to incident electromagnetic energy and a second portion of said element shielded from incident electromagnetic energy, each said target element being partially covered with a first material substantially reflective of incident electromagnetic energy and partially covered with a second material substantially absorptive of incident electromagnetic energy;

transmitting electromagnetic energy toward said array;

dynamically positioning said target elements on said support individually to expose in said first portion selected amounts of said first material and said second material so that electromagnetic energy reflected and emitted from said array of said elements simulates the reflectivity and emissivity characteristics corresponding to a first orientation of the target relative to the target background at a particular range relative to the seeker; and dynamically repositioning said target elements on said support individually to expose in said first portion selected amounts of said first material and said second material so that electromagnetic energy reflected and emitted from said array of said elements simulates the reflectivity and emissivity characteristics corresponding to a second orientation of the target relative to the target background at a particular range relative to the seeker.

* * * * *